April 21, 1936.  R. S. EDWARDS  2,038,075
TRANSFORMER AND POWER DISTRIBUTION ARRANGEMENT
Filed March 5, 1932  6 Sheets-Sheet 1
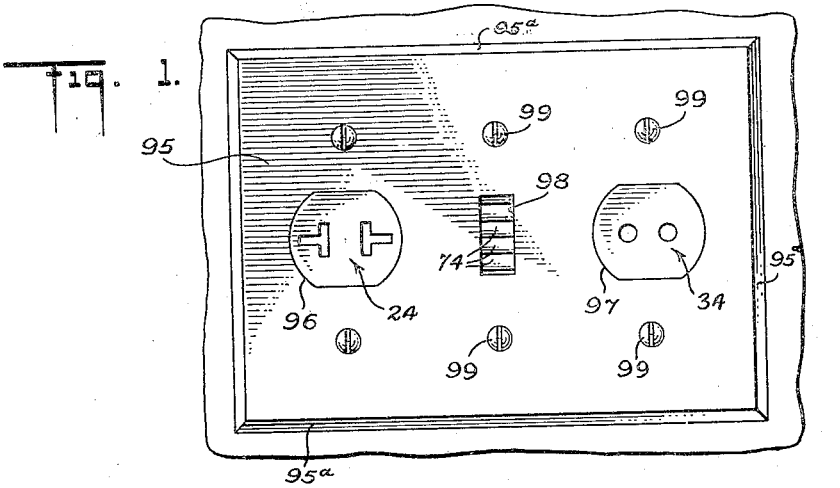
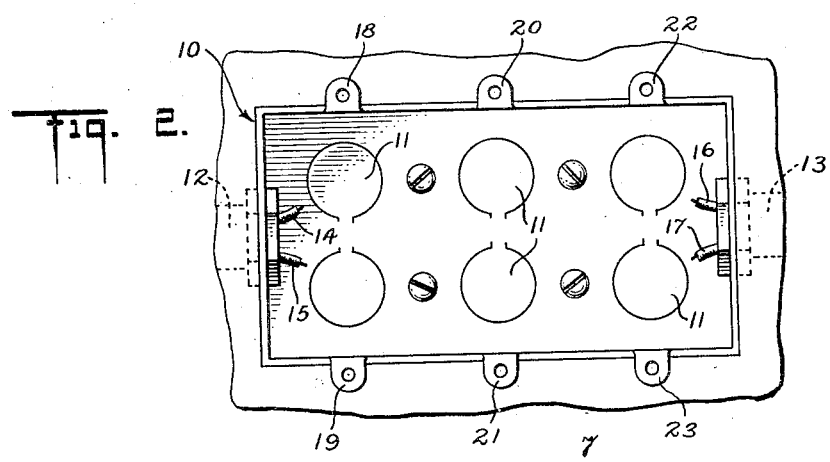
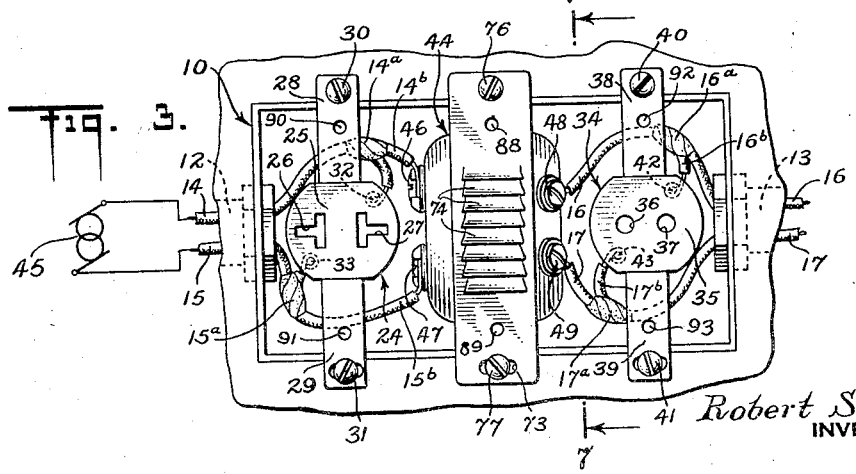
Robert S. Edwards
INVENTOR
BY James Blair Curtis
ATTORNEYS April 21, 1936.  R. S. EDWARDS  2,038,075
TRANSFORMER AND POWER DISTRIBUTION ARRANGEMENT
Filed March 5, 1932  6 Sheets-Sheet 2
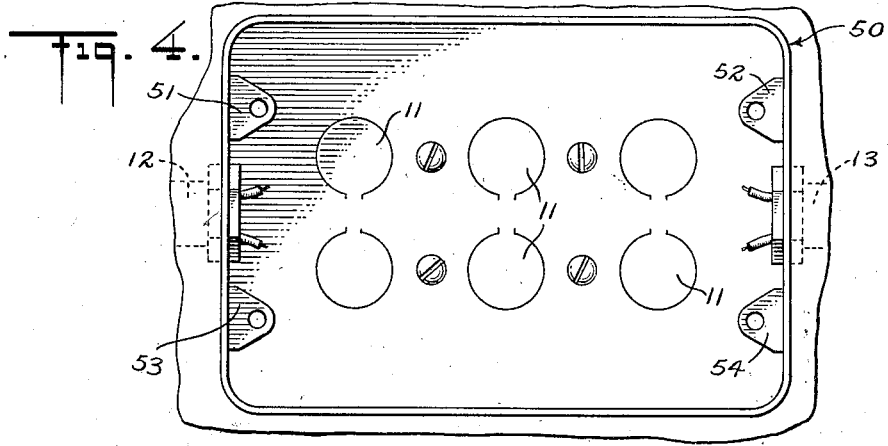
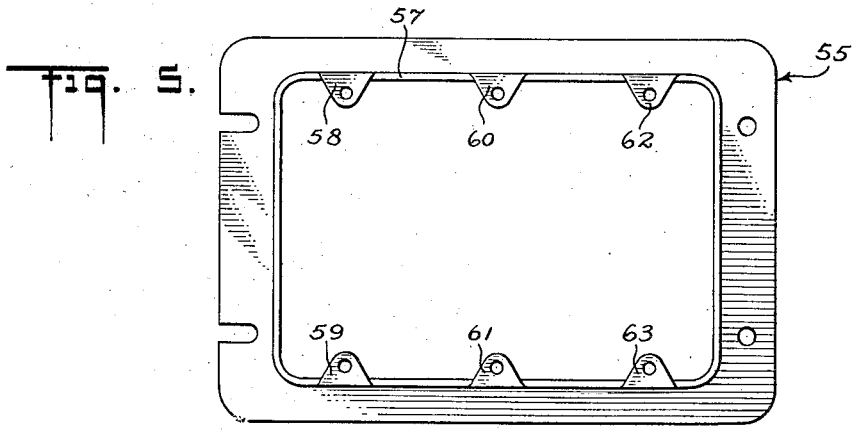
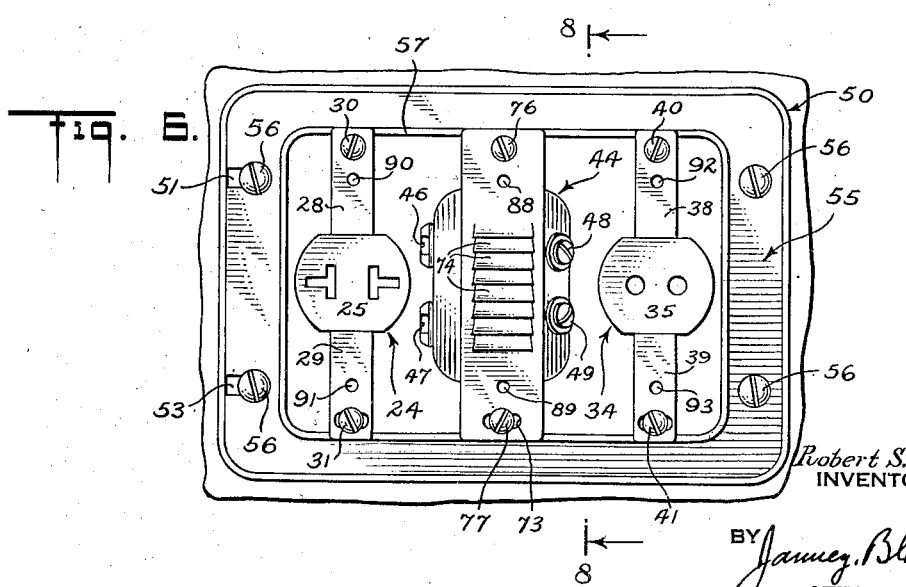
Robert S. Edwards
INVENTOR
BY Janney, Blair & Curtis
ATTORNEYS

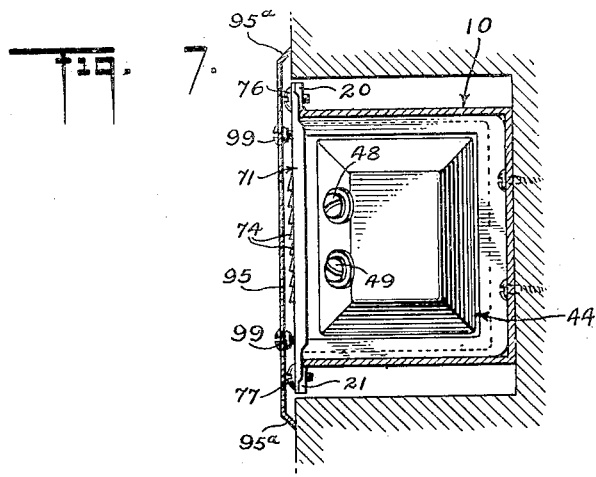
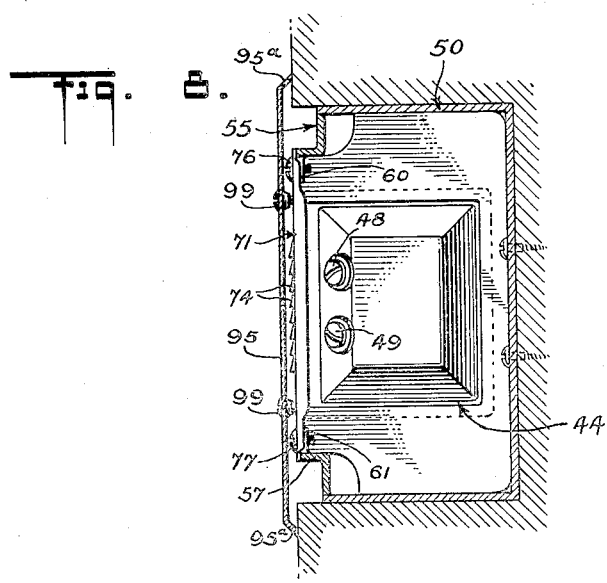

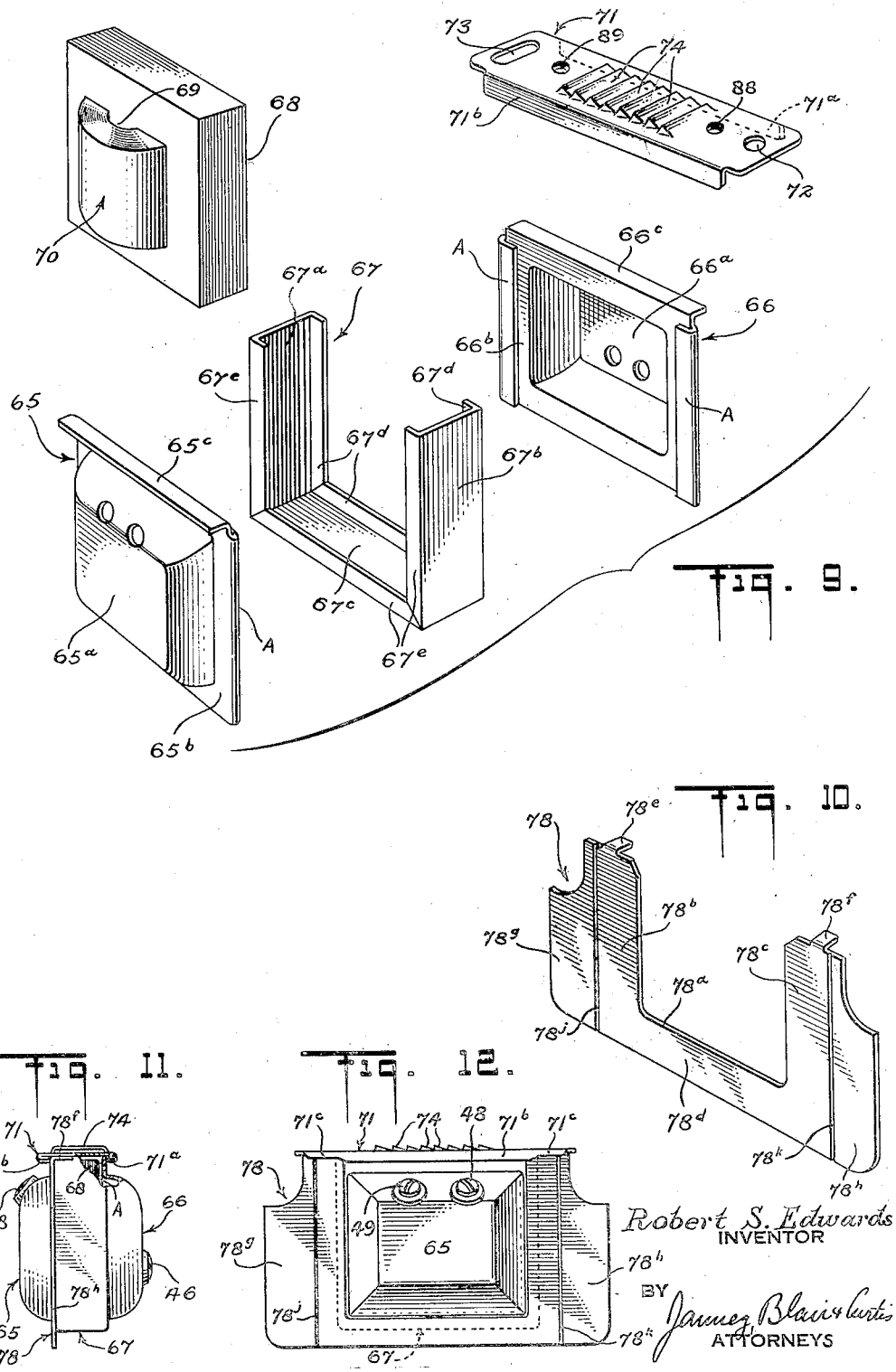

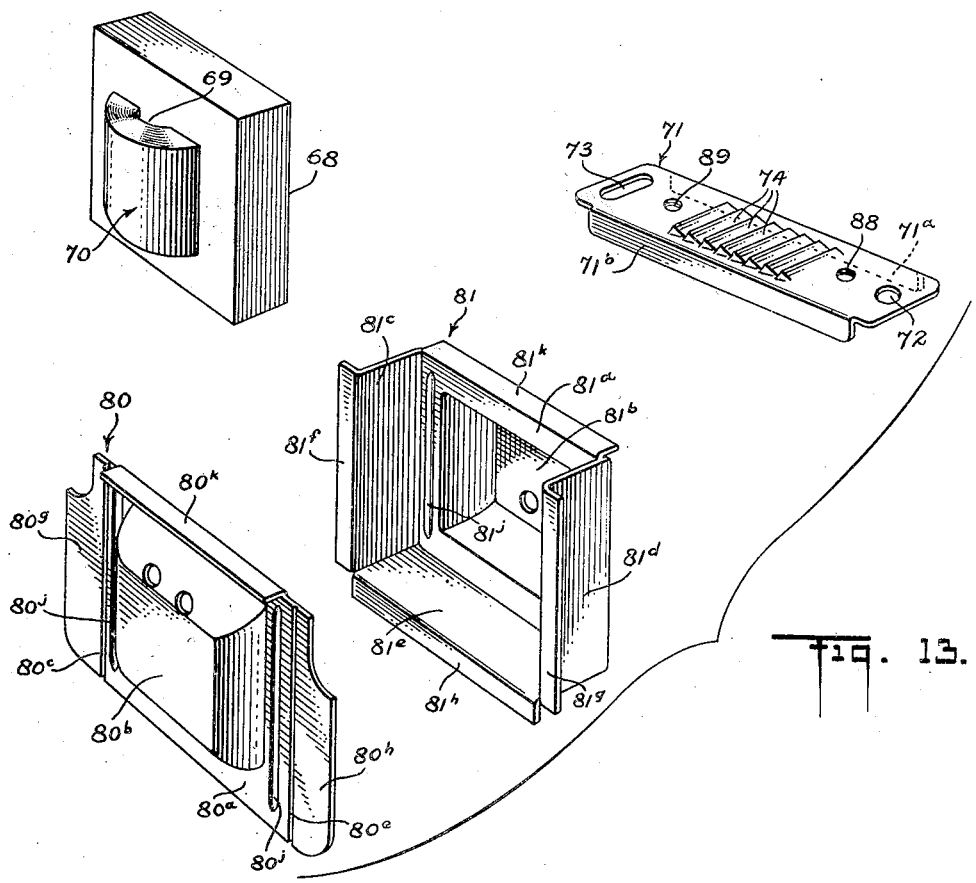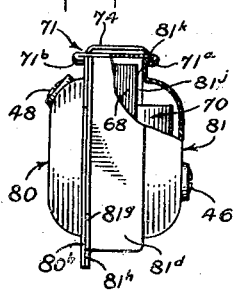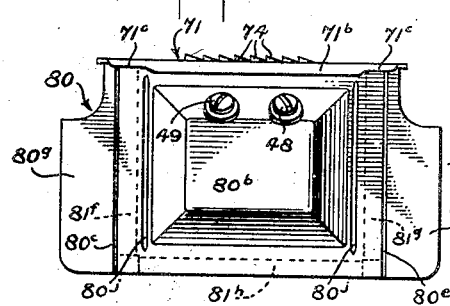

April 21, 1936. R. S. EDWARDS 2,038,075
TRANSFORMER AND POWER DISTRIBUTION ARRANGEMENT
Filed March 5, 1932 6 Sheets-Sheet 6
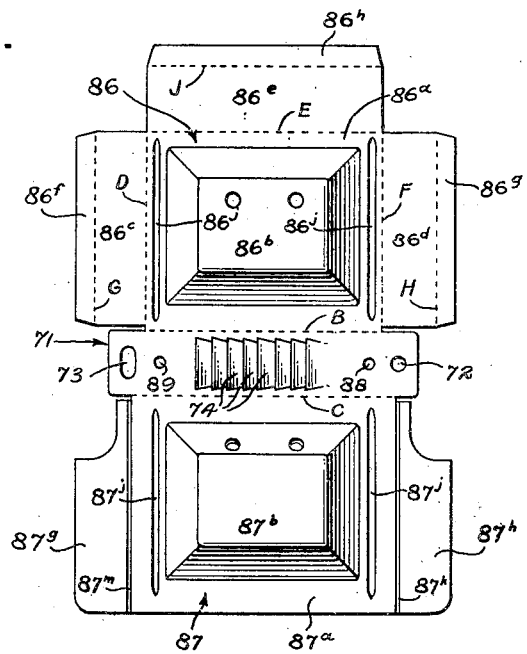
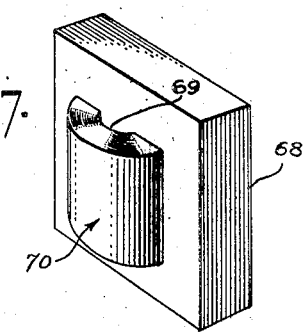
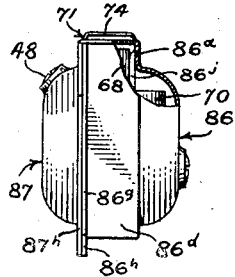
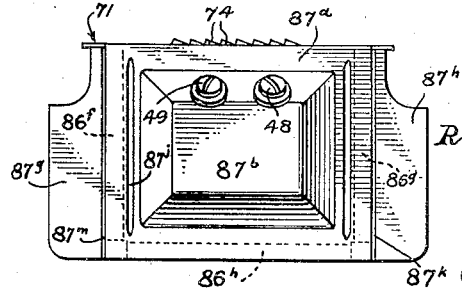
Robert S. Edwards
INVENTOR
BY Janney, Blair & Curts
ATTORNEYS Patented Apr. 21, 1936

2,038,075

UNITED STATES PATENT OFFICE 2,038,075

TRANSFORMER AND POWER DISTRIBUTION ARRANGEMENT

Robert S. Edwards, New Rochelle, N. Y., assignor to Edwards and Company, Inc., a corporation of New York Application March 5, 1932, Serial No. 596,932

22 Claims. (Cl. 247—1)

This invention relates to transformer and lower power installations more particularly such as are used in building construction where alternating current energy at the usual distribution voltage on the order of 110 volts has to be utilized and at the same time a low voltage, on the order of 15 volts or thareabouts, has to be supplied.

One of the objects of this invention is to provide a simple, practical, and inexpensive transformer construction and installation of the above-mentioned character adapted particularly for convenient and thoroughly reliable use in homes, offices, factories, and other buildings, or the like. Another object is to provide a compact and safe installation of both high and low voltage apparatus or devices and to make the latter quickly and conveniently and safely available. Another object is to provide a compact, inexpensive, and unitary installation of high and low voltage devices with the interposed transformer and in which low first cost, low cost of installation, and safety and reliability of operation are dependably achieved. Another object is to provide a transformer construction of the above-mentioned character adapted to function safely and reliably with both high voltage and low voltage devices or apparatuses connected thereto and yet well adapted to meet all the requirements of ease of installation, compactness and convenience of arrangement, and minimization of fire or other hazard. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which are shown several of the various possible embodiments of my invention, Figure 1 is a plan view of an illustrative installation, in the wall of a building, of both high and low voltage apparatus with the transformer interposed therebetween;

Figure 2 is a plan view of an outlet or wall box for receiving the above-mentioned devices and transformer;

Figure 3 is a plan view of the box of Figure 2 with illustrative high and low voltage devices and an interposed transformer installed therein;

Figure 4 is a plan view of another type of outlet or wall box;

Figure 5 is a plan view of an attachable cover-like mounting device for the box of Figure 4;

Figure 6 is a plan view showing illustrative high and low voltage devices with interposed transformer installed in the box construction of Figures 4 and 5;

Figure 7 is a vertical sectional view as seen along the line 7—7 of Figure 3;

Figure 8 is a vertical sectional view as seen along the line 8—8 of Figure 6;

Figure 9 is an exploded perspective view of the casing construction enclosing the transformer;

Figure 10 is a perspective view of a barrier embodied with the construction of Figure 9;

Figure 11 is an end view of the transformer unit showing the parts of Figures 9 and 10 in assembled relation;

Figure 12 is a side elevation of the transformer unit as seen from the left in Figure 11;

Figure 13 is an exploded perspective view of another form of casing construction for my transformer unit;

Figure 14 is an end elevation of the transformer unit of Figure 13;

Figure 15 is an end elevation as seen from the left in Figure 14;

Figure 16 is a developed plan of another possible form of casing construction for my transformer unit;

Figure 17 is a perspective view of the transformer per se similar to that which is included in Figures 9 and 13;

Figure 18 is an end view of the transformer unit embodying the parts shown in Figures 16 and 17, and Figure 19 is a side elevation as seen from the left in Figure 18.

Similar reference characters refer to similar parts throughout the several views of the drawings.

As conducive to a clearer understanding of certain features of this invention, it might at this point be noted that, in electrical installations in homes, offices, factories, and the like, which are supplied with alternating current at ordinary 110 volts, there frequently arises the need for operating low voltage devices such as door bells, annunciators, signal lights, electrical toys, outlet or plug connections, and the like, which operate on a voltage which may be illustratively set out as being of about 15 volts, all in contrast to the usual relatively high voltage devices such as various household appliances, lamps, outlets or plug connections, and the like, which are operated ordinarily at 110 volts. One of the dominant aims of this invention is to provide a simple, inexpensive, compact, and convenient installation for making such a divergent category of electrical devices safely and readily installable and available, all while achieving neatness and attractiveness in appearance.

Referring now first to Figure 2 of the drawings, I have there shown at 10 a wall or outlet box preferably of standard dimensions, made of any suitable heavy sheet material, provided with suitable knock-outs, some of which are indicated at 11, and adapted to be set into or built into the wall of the building in any suitable way; the box 10 is adapted to have secured to it, through suitable knock-outs, conduits (buried in the wall), two of which are shown at 12 and 13 and which may be considered for purposes of illustration to be intended to carry respectively the high voltage conductors and the low voltage conductors. The conduit 12, for example, may carry the conductors 14—15 into the box 10 from the source of 110-volt energy; the conduit 13 may, for purposes of illustration, be considered as carrying conductors 16—17 to, for example, a door bell and its control circuit, an annunciator and its control circuit, or any other low voltage device or apparatus, typically of 15 volts.

The box 10, preferably of standard construction, is one which has three pairs of laterally projecting ears 18—19, 20—21, and 22—23, each ear having therein a threaded opening adapted to receive a securing screw and the openings being spaced crosswise of the box by the usual or standard distance.

As typifying a high voltage device and not by way of limitation thereto, I have shown and generally indicated in Figure 3 a device 24 in the form of a 110-volt outlet or plug connector receptacle; the device 24, which may take any suitable or appropriate form, comprises an insulating member 25 appropriately slotted as at 26 and 27 to receive the contact prongs of the usual and known type of plug connector (not shown) in order to make detachable connection of any suitable device such as a 110-volt lamp, motor, household appliance, or the like, to the high voltage circuit 14—15.

The detailed construction of the device 24 may be of any desired character but it may be noted that it has related to it brackets 28 and 29 that contain openings or transverse slots, of standard spacing, and adapted to rest across the upper and lower side walls, as seen in Figure 2, of the box 10, suitable screws 30—31 threaded into the ears 18—19 (Figure 2) securing the brackets to the box 10 and thus holding the device 24 in depending relation inside of the box 10 but with the plane of its upper face, as viewed in Figure 3, extending somewhat above the plane of the edges of the open-ended wall box 10.

At its sides or on its under face the device 24 is provided with suitable binding posts indicated in Figure 3 at 32—33 to which are secured the bared conductors of the insulated high voltage wires 14—15 which lead into the box 10 through the conduit 12.

As typifying a low voltage apparatus or device but not by way of limitation to the specific form or embodiment of device shown, I provide in the right-hand end of the box 10 (see Figure 3) a device 34 which comprises an insulating block 35 provided with recesses 36—37 adapted to receive the prongs of a low voltage plug or connector which is adapted to lead low voltage energy, for example at 15 volts, to any desired device or apparatus or mechanism. Appropriate internal contact members are suitably mounted within the insulating block 34 and related to the recesses 36—37 for coaction with the contact prongs of the plug; these may take any suitable form, as is true also of the internal contact members related to the recesses 26—27 of the device 24 for coaction with the contact prongs of the plug that coacts with the latter device.

The insulating box 35 is provided with suitable brackets 38—39 extending substantially in the plane of the upper face of the block 34 and these brackets are provided with openings or slots spaced apart by the same standard distance as are the openings in the ears or flanges 22—23 (Figure 2) of the wall box 10. Hence bracket 38—39 may overlap the ears 22—23, just as brackets 28—29 of the device 24 overlap the ears 18—19. Suitable screws 40—41 threaded into the openings in the ears 22—23 secure the brackets and hence the device 34 in assembled relation to the box 10 and hold the device 34 in depending relation inside of the box.

At the sides or on the under side of the insulating block 35 there are provided suitable binding posts 42—43 (Figure 3) adapted to make a low voltage electrical connection to the internal contact members related to the recesses 36—37.

Interposed between the high voltage device 24 and the low voltage device 34 and depending into the box 10 is a suitable transformer generally indicated in Figure 3 at 44; insofar as the internal construction of the transformer 44 is concerned, it may be of any suitable or desired construction but is preferably of the shell type with a laminated core and, with the above-mentioned illustrative voltages of 110 and 15, it is wound to have a ratio of transformation of 110 to 15. Its casing construction, certain features of which are more specifically described hereinafter, is arranged to have high voltage or 110-volt binding posts 46—47 on one side wall of the casing and low voltage or 15-volt binding posts 48—49 on the opposite side wall of the casing.

When mounted within the wall box 10, in a manner described hereinafter, the transformer 44 is positioned so that the high voltage terminals 46—47 are adjacent or toward the high voltage device 24 and the low voltage terminals 48—49 adjacent or toward the low voltage device 34, as appears clearly from Figure 3.

The high voltage conductor 14 is spliced as at 14a to provide an extension 14b which is connected to the binding screw terminal 46; the other high voltage conductor 15 is spliced as at 15a to provide an extension 15b, the bared end portion of the wire of which is secured to the binding screw terminal 47. Thus the high voltage winding of the transformer 44 is connected to the high voltage circuit 14—15 which is energized from any suitable source of alternating current diagrammatically indicated at 45.

The low voltage conductors 16—17 (Figures 2 and 3) have their end portions stripped of the insulation and are connected respectively to the binding screw terminals 48—49, thus to be energized with low voltage alternating energy. The low voltage conductor 16 is spliced as at 16a to provide an extension 16b that is connected to the binding screw or terminal 42 of the low voltage device 34; the low voltage conductor 17 is spliced as at 17a to provide an extension 17b whose stripped end is connected to the binding screw 43 of the device 34. Thus the low voltage device 34 is spliced with low voltage energy, as are also the conductors 16—17 that lead out through the conduit 13 to distribute this low voltage energy to any suitable or desired points.

In Figure 4 I have shown another type of wall box 50 which, like the wall box 10, is of standard construction but is, for various reasons not important here, of larger dimensions. This box has at its left- and right-hand ends inwardly projecting ears 51—52 and 53—54 each having a threaded opening therein. Box 50 is provided with knock-outs 11 and illustratively has conduits 12 and 13 connected or brought thereto through suitable knock-outs.

A frame or cover-like member 55 (Figure 5) having external dimensions matching those of the open end of the box 50, is adapted to be placed over the box 50 and secured in place by screws 56 (Figure 6). The frame or cover 55 is provided with an upstanding rim 57 having inwardly projecting pairs of ears 58—59, 60—61, 62—63, provided with threaded openings, the spacing of which is, like the spacing of the threaded openings in the ears 18—19 etc., of Figure 1, of standard spacing.

In Figure 6 I have shown in plan the box 50 with the cover 55 applied and with the high voltage device 24, the low voltage device 34 and the interposed transformer 44 mounted in place but secured to the inwardly projecting ears of Figure 5, and electrically connected substantially the same as is shown in Figure 3 and as was described above in detail.

Considering now the transformer construction, reference may first be made to Figure 9 in which the conjoint parts of the transformer housing or casing are shown. The casing includes a sheet metal side wall 65 which is plane excepting for the bulge 65$^a$ pressed or stamped therein in such a way as to leave a peripheral plane flange portion 65$^b$; the bulge 65$^a$ carries the low voltage binding screw 48—49 mounted and insulated in any suitable manner. The upper edge of member 65 is bent outwardly to provide a flange 65$^c$.

A substantially similarly constructed side wall 66 is also provided; it likewise has a peripheral plane edge portion 66$^b$ and an outwardly directed bulge 66$^a$ which carries and supports in any suitable insulated way the high voltage binding posts 46—47, only the inner ends of which appear in Figure 9. It also has the upper horizontally extending flange 66$^c$.

The bottom and two end walls of the casing are made up of a single piece of sheet metal substantially as is shown at 67, the sheet metal being bent to provide opposed end walls 67$^a$ and 67$^b$ and a bottom wall 67$^c$, the piece being, moreover, so fashioned that, when bent up as just described, there are provided inwardly extending flanges 67$^d$ and 67$^e$.

Still referring to Figure 9, I provide a transformer construction which, as already above noted, is preferably of the shell type; it therefore preferably has a shell type of laminated core 68 about whose middle leg 69 extend the high and low voltage windings which together are generally indicated at 70. The windings 70 will be seen to project to both sides of the core 68 and it is for that reason that the bulges 65$^a$ and 66$^a$ in the sheet metal side walls 65 and 66 are formed; these bulges, moreover, are shaped to extend about the projecting portions of the windings 70 but in such a way as to leave a substantial space between the windings and the interior walls of the bulges when the side walls 65 and 66 are laid respectively against the front and back faces of the core 68; these three parts, thus temporarily assembled, are then related to the part 67 (Figure 9) whereupon the inwardly directed flanges 67$^d$ and 67$^e$, when finally bent to their right-angled relation as shown in Figure 9, clamp these three parts securely together, thus to substantially entirely encase the transformer 68—70, excepting for the top thereof.

Preferably I provide suitable spacers between the side faces of the core 68 and the inside faces of the plane peripheral portions 65$^b$ and 66$^b$ of the side wall members 65 and 66 respectively, and such spaces I may conveniently form by bending over and inwardly upon themselves, as at A the vertical side edges of the side members 65 and 66. These vertically extending spacers A thus hold the side wall members 65—66 spaced away, particularly at the upper portions thereof, from the flat faces of the core 68, leaving slot-like openings lengthwise across the upper end of the core 68 and between the latter and the side walls 65 and 66.

I then provide a combined casing-closure and transformer mounting device in the form of a sheet metal device 71 (Figure 9); the device 71 is preferably of relatively light sheet metal as are also the remaining portions of the transformer casing above described, and it is provided with openings 72—73 spaced apart by a standard distance equivalent to the spacing between the openings in the ears of the box 10 of Figure 2 or the ears of the cover member 55 (Figures 5 and 6) of the box 50 (Figure 4).

Extending lengthwise of the member 71 and bent at right angles thereto are side flanges 71$^a$ and 71$^b$ whose spacing is equivalent to the spacing between the outer edges of the flanges 65$^c$ and 66$^c$ of the side walls 65 and 66 respectively when the latter are assembled, as above described with respect to the part 67 and the transformer per se. Its central portion is transversely slotted and bent outwardly to provide louvers 74, for a purpose more clearly described hereinafter.

The cover 71 is then fitted over the thus far assembled transformer and casing members, the side flanges 71$^a$ and 71$^b$ receiving therebetween the horizontally extending flanges 65$^c$ and 66$^c$; the former flanges are thereupon bent inwardly into parallelism with the plane of the cover 71 and are thus lapped under and securely clamp the flanges 65$^c$ and 66$^c$ and the related parts together. This relation of these parts is better shown in Figure 11.

The slotted openings provided by the louvers 74 are thus put into communication with the free space between the side walls 65—66 and the core 68 and the windings 70, permitting the free circulation of air about these parts, thus to remove heat generated in the course of the operation of the transformer.

The inwardly bent flanges 71$^a$—71$^b$ in coaction with the right-angled flanges 65$^c$ and 66$^c$ achieve a substantial reinforcement of the parts and permit the use of sheet metal of relatively small gage.

It is the member 71, turning now to Figures 3 and 6, that bridges across the box and is secured by screws to the ears of the latter; thus, in Figure 3, screws 76 and 77 pass through the openings 72 and 73 respectively of the member 71 and are threaded into the ears 20—21 of the box 10 (Figure 2), while securing screws 76 and 77 secure the member 71 to the ears 60—61 respectively of the box 50—55 of Figures 4, 5, and 6; in each case the encased transformer 44 is virtually in depending relation within the box while the supporting and ventilating closure 71 extends crosswise of the box and, moreover, does so in substantially the same plane as contains the front or upper faces of the high voltage device 24 and the low voltage device 34.

The member 71 forms a dependable and rigid support for the transformer being materially reinforced by the inwardly bent flanges 71a and 71b even where the latter extend, in a direction lengthwise of the member 71, beyond the ends of the flanges 65c and 66c (see Figure 9 and also Figure 11).

Referring now to Figure 10, I have there shown in perspective a sheet metal shield or barrier 78 which is associated with the transformer where the casing of the latter is constructed as described above in connection with Figure 9. The member 78 is substantially U-shaped, being cut out as at 78a so as to accommodate between the upstanding arms 78b and 78c the bulge (65a or 66a of Figure 9) in a side wall of the casing, the cross-portion 78d being thus adapted to extend crosswise underneath this bulge.

The upper ends of the arm portions 78b and 78c are provided with tabs or flanges 78e—78f bent at right angles thereto so that when the member 78 is laid against one of the side walls 65 or 66 (see Figure 12), the tabs 78e and 78f rest flush against the under side of the combined supporting and ventilating member 71 (see Figure 11) to which they are secured in any suitable manner, as by riveting, welding, brazing, or the like. The member 78 is thus made additionally to reinforce and strengthen the supporting sheet metal member 71.

The member 78 (see Figures 10 and 12) is shaped so as to substantially match with the internal cross-sectional shape of the wall box of Figures 4, 5, and 6, a relation of parts better shown in Figure 8, the arm portions 78b and 78c having what might be termed wings 78g and 78h cut away at their upper ends so as to underlie the frame 55 that is secured to the box 50 (see Figures 5 and 4) and to extend to the upper and lower sides of the wall box, all as is better shown in Figure 8; the vertical dimension of the member 78 as viewed in Figures 10, 11, or 12, is such that when the transformer unit with its supporting member 71 is bridged and secured in place as above described, the member 78 virtually "bottoms" in the box or, as is better shown in Figure 8, contacts with the right-hand or bottom wall of the wall box 50.

Moreover, the cut away portions of the above-mentioned wings of the member 78 facilitate the insertion of the transformer in the wall box if the cover frame 55 (Figure 5) has already been assembled to the box 50 (Figure 4), the transformer being inserted in the box by alining it toward the longitudinal axis of the opening in the cover 55 and then swinging it to a position at right angles to the longitudinal axis of the box (see the position shown in Figure 6), the wings 78g and 78h being thus carried under the longitudinal portions of the cover frame 55 (see Figure 8) while the end portions of the supporting members 71 are swung onto the supporting ears 60—61 (Figure 5) to permit the transformer unit to be secured in place as by screws 76—77 (Figures 6 and 8) as already above described.

The member 78 thus coacts with the transformer per se to form a dependable barrier or physical separation, in the box (see Figures 6 and 8) between the high voltage devices or apparatuses on the one side (see Figure 6) and the low voltage devices or apparatuses mounted in the box on the other side. The barrier prevents the intermingling freely or otherwise within the box of high voltage and low voltage conductors and makes certain that, in installing the apparatus, the high voltage leads are brought into the box through knock-outs to the high voltage side of the barrier and that the low voltage leads or conductors are brought into the box through knock-outs on the other or low voltage side of the combination transformer and barrier. Dangers and fire hazards are thus effectively prevented.

Should the transformer unit, however, have to be installed in a box of the other type, such as the wall box of Figures 2 and 3 above described and the cross-section of which is different from the cross-section of the wall box in Figures 4-6, I provide for the speedy and ready fitting or accommodation of the combined transformer and barrier unit (Figure 12) to this different condition. Referring now again to Figure 12, I score or otherwise weaken the side arm portions 78b and 78c vertically as shown at 78j and 78k. This I may achieve in any suitable way and by any suitable tool; I may even stamp a suitable groove, indicated in Figure 10 at 78j and 78k, with the same tools and during the same operation with which I stamp up the sheet 78. This scoring or weakening thus defines the dividing line between the above-mentioned wings 78g and 78h and the latter are spaced horizontally as viewed in Figures 10 and 12 by the same distance as are the upper and lower side walls of the wall box 10 as the latter is viewed in Figures 2, 3, and 7.

Where, therefore, the high and low voltage apparatuses are to be installed in a wall box like the box 10 of Figures 2 and 3, the wings 78g and 78h (Figures 10 and 12) are, by any suitable tool such as a pair of pliers, simply bent at right angles to the plane of the main or remaining portion of the barrier plate 78 or are completely broken off; in either case, the transformer unit is thus easily and snugly fitted into the wall box 10, the plate 78 with the transformer sub-dividing the box into a high voltage compartment and into a low voltage compartment, just as was above described in connection with Figure 6. The supporting and ventilating member 71 is bridged across the ears 20—21 (Figures 2 and 3) and the transformer unit secured in place by screws 76—77, thus permanently maintaining the subdivision of the box as above described. Certain other features of action will be described hereinafter.

As typifying another possible and convenient way of carrying out certain features of my invention, reference may now be made to Figure 13, in which the transformer casing and the sub-dividing barrier above described are made up of sheet metal members generally indicated at 80 and 81, together with the already above described supporting and ventilating member 71, the latter being also shown in Figure 13.

More specifically, a suitable sheet metal is stamped up and ultimately bent into the form shown at 81 in Figure 13 to provide a side wall 81a with an outwardly directed bulge 81b, end walls 81c and 81d bent at right angles to the part 81a and a bottom wall 81e likewise bent at right angles to the side wall 81a. End walls 81c and 81d are flanged as at 81f and 81g as is also the bottom wall 81e, as at 81h, these flanges lying in a single plane.

The part 81 thus forms part of a casing into which the transformer 68—70 (Figures 13 or 9)

is fitted, the right- and left-hand marginal portions of the side wall 81ª being provided with vertical ribs 81ʲ (Figure 13) projecting inwardly and against these the transformer core 68 is adapted to rest so as to maintain the latter spaced from the plane of the side wall 81ª (see Figure 14). These ribs 81ʲ may be stamped or pressed during one of the operations of forming or bending up the casing part 81.

The transformer 68—70 having been thus inserted, the part 80 (Figure 13) may be related to the part 81; the part 80 comprises a single sheet metal member having a plane side wall portion 80ª with a bulge 80ᵇ forming a complement of the bulge 81ᵇ of the member 81 and it has inwardly directed ribs 80ʲ adapted to contact with the transformer core 68 to hold the plane side wall portion 80ª spaced away from the transformer core.

The flanges 81ᶠ, 81ʰ, and 81ᵍ of the member 81 (Figure 13) rest against the plane portion 80ª of the member 80 and are secured to the latter in any suitable manner preferably as by welding.

In securing these parts 80—81 together, their upper horizontally extending flanges 80ᵏ and 81ᵏ fall in substantially the same plane and are then received between the flanges 71ª and 71ᵇ of the member 71, the latter flanges being thereupon bent inwardly and under the flanges 80ᵏ and 81ᵏ, respectively (see Figure 14 and also Figure 15), thus closing the transformer casing and reinforcing the member 71.

The flanges of the latter, where they extend beyond the flanges of the side walls of the casing, are pressed against the under face of the member 71 as at 71ᶜ (Figure 15) just as was done with the construction shown in Figure 12, whereby a dependable and rigid reinforcement of the member 71 is achieved.

The ribs 80ʲ and 81ʲ hold their respective side walls spaced away from the transformer core just as did the inwardly bent flanges A of the side wall members of the casing shown in Figure 9 (see also Figure 11) thus to make the windings 70 of the transformer accessible to the exterior atmosphere through the dust and weather-proof slots 74 of the member 71 and to achieve dependable and reliable cooling and ventilation of the core and windings.

But, as is better shown in Figures 13 and 15, the member 80 has side wings 80ᵍ and 80ʰ shaped and dimensioned just as are the wings 78ᵍ and 78ʰ of Figures 10 and 12, being separated from the projecting or extending portions of the side wall portion 80ª by scoring or half cuts 80ᶜ and 80ᵉ.

If, therefore, the construction of Figures 13, 14, and 15 is to be embodied in a wall box like that of Figures 4 and 6, it may be handled and installed much in the same way as was above described in connection with the construction of Figures 9, 10, 11, and 12, the downwardly (as viewed in Figures 14 and 15) and laterally extending portions, including the wings 80ᵍ and 80ʰ, fitting the box 50, as is shown in Figure 8; but if the high and low voltage apparatus is to be installed in a wall box of the standard size or style of the box 10 of Figures 2 and 3, then the wings 80ᵍ and 80ʰ are bent at right angles to the portion 80ª or are broken off, in either case along the half cuts or scoring 80ᶜ and 80ᵉ, leaving a barrier projecting from the sides and bottom of the transformer casing per se that snugly fits into the wall box 10 in a manner best shown in Figure 7, thus again sub-dividing that different style or type of wall box into high voltage and low voltage compartments.

In Figures 16–19 I have shown another embodiment of certain features of my invention and which have certain advantages in practice. In Figure 17 I have again shown the transformer 68—70, similar to that shown in Figures 9 or 13, and in Figure 16 I have shown in partially developed form the combined casing and barrier and ventilating structure which, with the transformer 68—70, may be made to make up my transformer unit.

Referring now particularly to Figure 16, I shape, as by any appropriately constructed punches and dies, a single piece of sheet metal into a side wall 86, a side wall 87, connected by a top combined closing wall ventilating and supporting member 71; the latter has dimensions and features of construction similar to the member 71 of Figures 9 and 13 excepting for the downwardly bent flanges 71ª and 71ᵇ. For example, it has the openings or slots 72 and 73 and the covered slots or ventilating openings 74. The parts 86—71—87 are integral and are adapted, later on, to be bent at right angles to each other along the dotted lines B and C.

The side wall member 86 has a plane portion 86ª with a bulge 86ᵇ therein corresponding to the bulge 81ᵇ, for example, of Figure 13, and it has flap-like extensions 86ᶜ, 86ᵈ and 86ᵉ which, when bent at right angles to the plane of the portion 86ª along the dotted lines D, E, and F form respectively end and bottom walls for the casing of the transformer 68—70.

The flaps 86ᶜ, 86ᵈ and 86ᵉ are, moreover, shaped or extended so that, when bent at right angles along the lines G, H, and J, flanges 86ᶠ, 86ᵍ, and 86ʰ are formed, lying in the same plane (see Figure 18) and these are adapted to abut against the plane portion 87ª of the member 87, the latter having a bulge 87ᵇ similar to the bulge 86ᵇ of the member 86.

The plane side wall portions 86ª and 87ª are provided with vertically extending inwardly pressed ribs or depressions 86ʲ and 87ʲ which are adapted, when the parts 86 and 87 are bent at right angles to the part 71 along the lines B and C respectively to contact with the transformer core 68 and hold the latter spaced from the side walls and to insure air passages communicating from the spaces around the windings and the core to and through the slots 74 to the atmosphere.

The flanges 86ᶠ, 86ʰ, and 86ᵍ are secured in any suitable manner, as by welding (see Figures 18 and 19) to the plane side wall portion 87ª, thus encasing the transformer 68—70.

The part 87, however, still referring to Figure 16, has downward and lateral extensions, the lateral extensions 87ᵍ and 87ʰ being shaped like the wings 78ᵍ and 78ʰ above described in connection with the barrier 78 of Figure 10 and are marked off from the main body portion of the part 87 by vertical scoring 87ʲ and 87ᵏ, just as was described in connection with the part 78 of Figure 10.

The resultant assembled transformer unit is better shown in Figures 18 and 19. Where it is desired to relate it with high and low voltage devices or apparatuses in a wall box like the box 50 of Figures 4 and 6, the downwardly and laterally extended side wall 87ª fits snugly into the box, the member 71 bridges across the ears 60—61 and may be secured to the latter by screws 76—77 (Figure 6), and the box dependably sub-divided into a high voltage and a low voltage compartment.

Should the construction of Figures 15–19, however, be related to a wall box of different standard construction, such as the wall box 10 of Figures 2 and 3, the wings 87g and 87h (Figures 16 and 19) are bent at right angles or broken off along the scoring 87m and 87k respectively, whereupon the laterally and downwardly projecting sheet metal of the part 87 is snugly fitted into the box 10, member 71 bridging across the ears 20—21 (Figures 2-3) and secured thereto by the screws 76—77 (Figure 3) and this different standard box sub-divided into high voltage and low voltage compartments. The relation of the parts is clearly shown in Figure 7 with respect to the wall box 10 and is shown in Figure 8 with respect to a wall box on the style of the box 50.

The member 71 (Figures 9, 13, and 16) has two holes 88—89 formed therein, these holes being preferably not simply punched through the sheet metal but the metal drawn downwardly as viewed in these figures so as to form downwardly extending tube-like portions which are then threaded, the tube-like extensions permitting the provision in the sheet metal part 71 and with respect to each opening 88 and 89 of an adequate number of threads.

The spacing between the openings 88—89 is preferably a so-called standard spacing, being equivalent to the spacing between the openings in a standard wall plate and through which the wall-plate-securing screws are to be passed.

Referring to Figures 3 and 6, the metal supporting devices of the high and low voltage apparatuses 24 and 34 are provided with openings 90—91 and 92—93 respectively, also threaded and spaced apart by the same standard spacing.

Whether the various devices have been installed in a wall box of the type shown at 10 in Figure 2 or of the type shown at 50 in Figures 4-5, there is then placed over the installation a wall or finishing or cover plate 95 (Figure 1) provided with openings 96 and 97 shaped to just allow the insulating blocks 25 and 35 of the high and low voltage devices 24 and 34 respectively (Figures 3 and 6) to mate therewith or to just project thereinto and with a central rectangularly shaped opening 98 (Figure 1) adapted to overlap the protected dust or weather-proof slots 74 of the supporting and ventilating member 71 of the combined transformer and barrier unit.

The finishing plate 95 (Figures 1, 7, and 8) is preferably beveled or flanged as at 95a and is dimensioned to well overlap the recess in the wall in which the wall box is mounted (see Figures 7 and 8) and to contact with the wall itself; thereupon screws 99 (Figures 1, 7, and 8) are passed through openings in the plate 95 spaced vertically by the above-mentioned standard spacing and are threaded into the threaded openings 90—91 of the device 24 (Figures 3 and 6) 88—89 of the device 71, and 92—93 of the device 34.

Thus the otherwise anomalous high voltage and low voltage devices are reliably and dependably mounted and installed and housed for safe and convenient operation and use. The high voltage device, no matter what form it takes and illustratively above described in the form of a high voltage outlet, is dependably segregated mechanically and electrically from the low voltage device no matter what form the latter takes and illustratively above described as a low voltage outlet, by the transformer and barrier construction which itself electrically achieves the proper and desired relation between the high voltage and low voltage device. The transformer is dependably ventilated and prevented from becoming overheated inasmuch as the air-cooling thereof is dependably and efficiently carried on, heated air escaping through the uppermost slots 74 and fresh or cool air entering through the lowermost slots 74, all through the window or opening 98 (Figure 1) in the cover plate 95.

Moreover, there is no possibility of either intentional or unintentional comingling of high voltage and low voltage conductors, the transformer and barrier construction segregating the wall box into two compartments (see Figures 7 and 8) and even if a conductor were to be run from one compartment to the other, the erroneous or dangerous condition could not continue because the combined transformer and barrier construction would collide with such a conductor and could not be fitted into place; thus these features of my invention insure safe and proper installation and function virtually as a "tell-tale".

It will thus be seen that there has been provided in this invention an apparatus and construction in which the several objects hereinabove pointed out, together with many thoroughly practical advantages are successfully achieved. The construction is inexpensive, thoroughly practical, efficient and reliable, is inexpensive to install, facilitates testing of the circuits and apparatuses in the course of installation and makes possible the achievement of a neat, compact, and safe installation. Moreover, what physical electrical insulation exists between the high voltage compartment and the low voltage compartment will be seen to be achieved by the dependable and reliable insulation between the high voltage and low voltage windings of the transformer itself, such insulation being appropriately proportioned and designed, with an adequate factor of safety, for insulation of the voltages in question, two typical voltages of which have been above illustratively set forth, while intermingling or comingling of high and low voltage conductors is dependably prevented.

As many possible embodiments may be made in the above invention and as many changes might be made in the embodiment above set forth, it is to be understood that all matter hereinbefore set forth or shown in the accompanying drawings is to be interpreted as illustrative and not in a limiting sense.

I claim:

1. In apparatus of the character described, in combination, a standard wall box having two compartments therein, a high voltage device in one compartment, and a low voltage device in the other compartment, the dividing wall between said compartments being formed by a transformer having said high voltage device connected to the high side thereof and said low voltage device connected to the low side thereof and a sheet metal casing for said transformer, said casing having sheet metal extensions extending crosswise of said box to form with the casing said dividing wall, said extensions having markings thereon along which they are bendable or breakable to cause them to suit differently cross-sectioned boxes.

2. In apparatus of the character described, in combination, a standard wall box having two compartments therein, a high voltage device in one compartment, and a low voltage device in the other compartment, the dividing wall between said compartments being formed by a transformer having said high voltage device connected to the high side thereof and said low voltage device connected to the low side thereof and a sheet metal casing for said transformer, said casing having sheet metal extensions extending crosswise of said box to form with the casing said dividing wall, said extensions being weakened along lines along which said extensions are bendable or breakable to reduce the dimensions to fit a box of smaller cross-section.

3. In apparatus of the character described, in combination, a transformer having a core and windings, a sheet metal casing enclosing all but one side of said transformer and holding the core spaced from said casing, said casing having outwardly directed flanges along the open end thereof, and a ventilating closure for said open side of said casing, said closure having ventilating openings therein and flanges adapted to be interlocked with said first-mentioned flanges, said ventilating openings being in communication with the interior of said casing through the spaces between the latter and said core.

4. In apparatus of the character described, in combination, a transformer having a core and windings, a sheet metal casing enclosing all but one side of said transformer and holding the core spaced from said casing, said casing having outwardly directed flanges along the open end thereof, and a combined closure and support for said casing comprising a sheet metal member having ventilating openings therein in communication with the spaces between the core and said casing and having flanges interlocked with said first-mentioned flanges, said closure extending at two ends beyond the closed end of said casing and said ends having openings therein spaced apart by the standard distance of the threaded openings in an outlet box.

5. In apparatus of the character described, in combination, a transformer and a casing therefor, said casing being made of sheet metal and having means whereby said transformer with the casing may be secured within an outlet box, said casing having a bulge in a side wall thereof for accommodating parts of said transformer, and a substantially U-shaped member secured to said casing about said bulge, the said U-shaped member extending beyond said casing and being shaped to fit into a wall box.

6. In apparatus of the character described, in combination, a transformer and a casing therefor, said casing being made of sheet metal and having a pair of oppositely directed lugs for suspending said transformer within a wall box from the threaded ears or flanges of the latter, said casing having a bulge substantially centrally thereof for accommodating parts of said transformer, and a substantially U-shaped member secured to said casing about said bulge and having a portion that extends beyond said casing and shaped to fit into a wall box, said U-shaped member being made of sheet metal and having its said portion marked off along a line along which said portion is bendable, or severable to fit it into a box of different dimension.

7. In apparatus of the character described, in combination, a transformer and a sheet metal casing therefor, said casing having a bulge substantially centrally thereof for accommodating parts of said transformer, said casing having a metal supporting member adapted to bridge across and be secured to the threaded flanges or ears of a wall box, and a sheet metal substantially U-shaped member fitted about said bulge and secured to said supporting member, said U-shaped member extending the dimensions of said casing to the inside dimensions of a wall box.

8. In apparatus of the character described, in combination, a transformer having a core and windings; and a sheet metal casing and support therefor made of a single piece of sheet metal bent to encase said transformer and to provide opposed ears apertured to receive screws for securing it to a standard conduit or outlet box, said sheet metal casing and said core being interlocked with each other.

9. In apparatus of the character described, in combination, a transformer having a core and windings; and a sheet metal casing and support therefor made of a single piece of sheet metal bent to encase said transformer and to provide opposed ears apertured to receive screws for securing it to a standard conduit or outlet box and having portions projecting beyond the casing to cause the latter with said portions to substantially match the internal dimensions of a conduit box.

10. In apparatus of the character described, in combination, a transformer having a core and windings; and a sheet metal casing and support therefor made of a single piece of sheet metal bent to encase said transformer and to provide opposed ears apertured to receive screws for securing it to a standard conduit or outlet box and having portions projecting beyond the casing to cause the latter with said portions to substantially match the internal dimensions of a conduit box, said projecting portions being severable to cause them with said casing to fit a box of smaller cross-section.

11. In apparatus of the character described in combination, a wall box having adjacent its upper open end opposed threaded flanges, a transformer and a casing therefor, said casing being made of sheet metal and having a pair of oppositely directed lugs projecting from its opposed upper ends for engaging said threaded flanges and for thereby suspending said transformer within said wall box and said transformer and casing thereby being positioned within said box and at the inner side of the plane of its said upper open end, said flanges and said lugs being spaced so that the latter rest upon the former, said lugs being formed by lateral extensions of the upper end wall of said casing, said casing having other sheet metal extensions dimensioned so that said casing and said other extensions in cross-section, when thus suspended within said box, fit into the latter, and means securing said lugs to said opposed threaded flanges respectively, said flanges alining said lugs relative to said wall box and thereby alining and holding said casing with its said other extensions crosswise of said wall box to form a dividing barrier in the latter.

12. In apparatus of the character described, in combination, a transformer having a core and windings, a sheet metal casing having portions enclosing all but one side of said transformer, said core being made up of laminations whose edges extend along said one side, said sheet metal casing having another portion which closes over said one side and is extended beyond opposed ends of the latter to provide supporting lugs, said last-mentioned portion having flange-like means at its other opposed ends for holding said laminations together.

13. In apparatus of the character described, in combination, a transformer having a core and windings, a sheet metal casing having portions enclosing all but one side of said transformer, said core being made up of laminations whose edges extend along said one side, said sheet metal casing having another portion which closes over said one side and is extended beyond opposed ends of the latter to provide supporting lugs, said last-mentioned portion having flange-like means at its other opposed ends for engagement with opposed portions of said sheet metal casing and for clamping said opposed portions and the laminations of said core therebetween.

14. In apparatus of the character described, in combination, a transformer having a core and windings, a sheet metal casing enclosing all but one side of said transformer and a combined closure and support for said casing comprising a sheet metal member having louvered ventilating openings therein in communication with the interior of said casing and having reinforcing flanges extending lengthwise thereof, said flanges engaging with opposed portions of said sheet metal casing on opposite sides of said core for clamping said opposed portions and core together, said closure extending at two ends beyond the closed end of said casing to form supporting lugs for coaction with a suitable mounting for said transformer and casing.

15. In apparatus of the character described, in combination, a transformer having a core and windings, a sheet metal casing enclosing all but one side of said transformer and a combined closure and support for said casing comprising a sheet metal member having louvered ventilating openings therein in communication with the interior of said casing and having reinforcing flanges extending lengthwise thereof, said flanges engaging with opposed portions of said sheet metal casing on opposite sides of said core for clamping said opposed portions and core together, said closure extending at two ends beyond the closed end of said casing to form supporting lugs for engagement with the opposed supports of a wall box, one of said opposed casing portions having extensions beyond the dimensions of said casing and shaped to fit into said box to form a dividing barrier therein.

16. In apparatus of the character described, in combination, a transformer having a core and windings; and a sheet metal casing and support therefore made of a single piece of sheet metal bent to encase said transformer, at least one wall of said casing having two opposed side edges thereof bounded by bends at a substantial angle to the plane of said wall, said wall having louvered openings extending transversely of said opposed side edges, whereby said bounding bends reinforce the louvered portion of said wall.

17. In apparatus of the character described, in combination, a transformer having a core and windings, a sheet metal casing having portions enclosing all but one side of said transformer, said portions including two opposed side wall portions one of which is of greater lateral expanse than the other, thereby to form a sheet metal wing-like extension of the outside dimensions of the casing, said core being made up of laminations whose edges extend along said one side, said sheet metal casing having another portion which closes over said one side and is extended beyond opposed ends of the latter to provide supporting lugs, said last-mentioned portion having flange-like means at its other opposed ends for engagement with said opposed portions of said sheet metal casing and for clamping said opposed portions and the laminations of said core therebetween.

18. In apparatus of the character described, in combination, a transformer having a core and windings, a sheet metal casing having portions enclosing all but one side of said transformer, said portions including two opposed side wall portions one of which is of greater lateral expanse than the other, thereby to form a sheet metal wing-like extension of the outside dimensions of the casing and both of said opposed portions having outwardly directed flanges extending along said one side of said transformer, said core being made up of laminations whose edges extend along said one side, said sheet metal casing having another portion which closes over said one side and is extended beyond opposed ends of the latter to provide supporting lugs, said last-mentioned portion having flange-like means at its other opposed ends for engagement with said flanges of said opposed portions of said sheet metal casing and for clamping said opposed portions and the laminations of said core therebetween.

19. In apparatus of the character described, in combination, a transformer having a core and windings, a sheet metal casing enclosing all but one side of said transformer and including two opposed side wall portions having flanges extending therealong at the said one side of said transformer, a combined closure and support for said casing comprising a sheet metal member closing over said one side and extended beyond opposed ends of the latter to provide supporting lugs, and means rigidly interconnecting said sheet metal member and said flanges whereby the latter reinforce said sheet metal member.

20. In apparatus of the character described, in combination, a transformer having a core and windings, a sheet metal casing enclosing all but one side of said transformer and comprising two sheet metal parts which provide two opposed side wall portions with connecting wall portions joining them together on all of the remaining sides of said transformer excepting said one side, said two opposed side wall portions having flanges extending therealong at the said one side of said transformer, a combined closure and support for said casing comprising a sheet metal member closing over said one side and extended beyond opposed ends of the latter to provide supporting lugs, said sheet metal member having flanges bent over said first-mentioned flanges, thereby to hold said sheet metal member in closing position and thereby to reinforce said sheet metal closure member by the action of all of said flanges.

21. In apparatus of the character described, in combination, a transformer having a core and windings, a sheet metal casing enclosing said core and windings, and means for securing said transformer within a wall or conduit box, said sheet metal casing having extension means dimensioned to increase the casing dimensions substantially to match the interior of the wall or conduit box thereby to form a barrier or partitioning wall therein, said extension means being weakened along a line whereby it is readily severable to reduce its extent and cause the casing with its said extension means to fit a smaller box.

22. A construction like that claimed in claim 20 in which one of said two opposed side wall portions is provided with extension means giving it a greater dimension than the other of said opposed side wall portions, and sufficiently so to cause it to substantially fit into the interior of an outlet box.

ROBERT S. EDWARDS.